United States Patent
Hars et al.

(10) Patent No.: US 7,822,995 B2
(45) Date of Patent: Oct. 26, 2010

(54) APPARATUS AND METHOD FOR PROTECTING DIAGNOSTIC PORTS OF SECURE DEVICES

(75) Inventors: Laszlo Hars, Cranberry Township, PA (US); Donald Rozinak Beaver, Pittsburgh, PA (US)

(73) Assignee: Seagate Technology LLC, Scotts Valley, CA (US)

( * ) Notice: Subject to any disclaimer, the term of this patent is extended or adjusted under 35 U.S.C. 154(b) by 1168 days.

(21) Appl. No.: 11/070,911

(22) Filed: Mar. 3, 2005

(65) Prior Publication Data
US 2006/0200682 A1 Sep. 7, 2006

(51) Int. Cl.
G06F 11/26 (2006.01)
G06F 11/36 (2006.01)

(52) U.S. Cl. .................. 713/193; 713/192; 713/194; 714/5; 714/23; 714/30; 714/31; 714/742

(58) Field of Classification Search ................. None
See application file for complete search history.

(56) References Cited

U.S. PATENT DOCUMENTS

| 5,467,396 | A | 11/1995 | Schossow et al. |
|---|---|---|---|
| 5,469,557 | A | 11/1995 | Salt et al. |
| 5,515,540 | A | 5/1996 | Grider et al. |
| 6,026,293 | A | 2/2000 | Osborn |
| 6,085,090 | A * | 7/2000 | Yee et al. ............... 455/440 |
| 6,272,637 | B1 | 8/2001 | Little et al. |
| 6,466,048 | B1 * | 10/2002 | Goodman ............... 326/8 |
| 6,475,180 | B2 * | 11/2002 | Peterson et al. ............ 604/65 |
| 6,633,807 | B2 * | 10/2003 | Augsburger et al. ........ 701/115 |
| 2002/0013670 | A1 | 1/2002 | Ouellette et al. |
| 2002/0174342 | A1 | 11/2002 | Freeman et al. |
| 2003/0014642 | A1 | 1/2003 | Martinsson et al. |
| 2003/0212897 | A1 | 11/2003 | Dickerson et al. |
| 2004/0025027 | A1 | 2/2004 | Balard et al. |
| 2005/0259814 | A1 * | 11/2005 | Gebotys ............... 380/28 |

* cited by examiner

Primary Examiner—Nasser Moazzami
Assistant Examiner—Fatoumata Traore
(74) Attorney, Agent, or Firm—Robert P. Lenart, Esq.; Pietragallo Gordon Alfano Bosick & Raspanti, LLP

(57) ABSTRACT

An electronic system comprises a processor, a diagnostic port, and a switching circuit, including a switch connected between the diagnostic port and the processor, for enabling and disabling the diagnostic port and for restricting access to contents of the electronic system prior to enabling the diagnostic port. A method for operating the electronic system is also included.

13 Claims, 2 Drawing Sheets

APPARATUS AND METHOD FOR PROTECTING DIAGNOSTIC PORTS OF SECURE DEVICES

FIELD OF THE INVENTION

This invention relates to electronic devices and more particularly to the control of access to electronic devices.

BACKGROUND OF THE INVENTION

Diagnostic ports, such as a JTAG (Joint Test Action Group) port, are provided on microprocessor-controlled systems to permit diagnosing of hardware or software problems. Standard, off-the-shelf equipment can be connected to a system through these ports to directly control the connected microprocessor, memory, and/or peripheral ports, for performing CPU commands, tracing program execution, stopping at breakpoints, etc. Such diagnostic ports are invaluable tools for searching for the cause of unexpected behavior of a system. Therefore, these ports should be built into the system and not permanently disabled or removed after manufacturing.

While diagnostic ports support the diagnosis of problems in microprocessor-controlled systems, they are also a source of vulnerability. An adversary can connect a debugger to the port and access all the secrets on the security system. Therefore, the use of these ports must be controlled. Methods and devices which protect sensitive data by making it inaccessible (either ab initio or by active erasure) when access to a diagnostic port is attempted have been described.

Other control solutions include fuses, which can be blown to permanently disable the diagnostic ports after their use. However, security systems using permanent changes (such as fuses), cannot be reused after diagnosis.

Hardware or software authentication mechanisms such as passwords, tokens, biometrics etc., could also be used. Special software (or firmware) versions can be authenticated and loaded to open up the ports. Switches or jumpers can be used to activate special resident firmware versions, which open up the ports. The main drawback of these methods is that activation of the diagnostic ports requires functional authentication, so problems affecting that function cannot be diagnosed.

After opening up the ports, all the confidential data that was stored in the system, which might not have been deleted because of a system failure, become available. Therefore, it would be desirable to delete confidential data before enabling the diagnostic port and to restore the confidential data after the diagnostic operation is completed.

This invention provides a system having a diagnostic port, wherein access to secure components of the system is prevented.

SUMMARY OF THE INVENTION

An electronic system constructed in accordance with this invention comprises a processor, a diagnostic port, and a switching circuit including a switch connected between the diagnostic port and the processor, for enabling and disabling the diagnostic port and for restricting access to contents of the electronic system prior to enabling the diagnostic port.

In another aspect, the invention encompasses a method of operating an electronic system. The method comprises: providing a switching circuit including a switch connected between a diagnostic port and a processor, for enabling and disabling the diagnostic port, determining the operational status of the switch, and using the switching circuit to restrict access to contents of the electronic system in response to the operational status of the switch prior to enabling the diagnostic port.

DETAILED DESCRIPTION OF THE INVENTION

Figure 1:
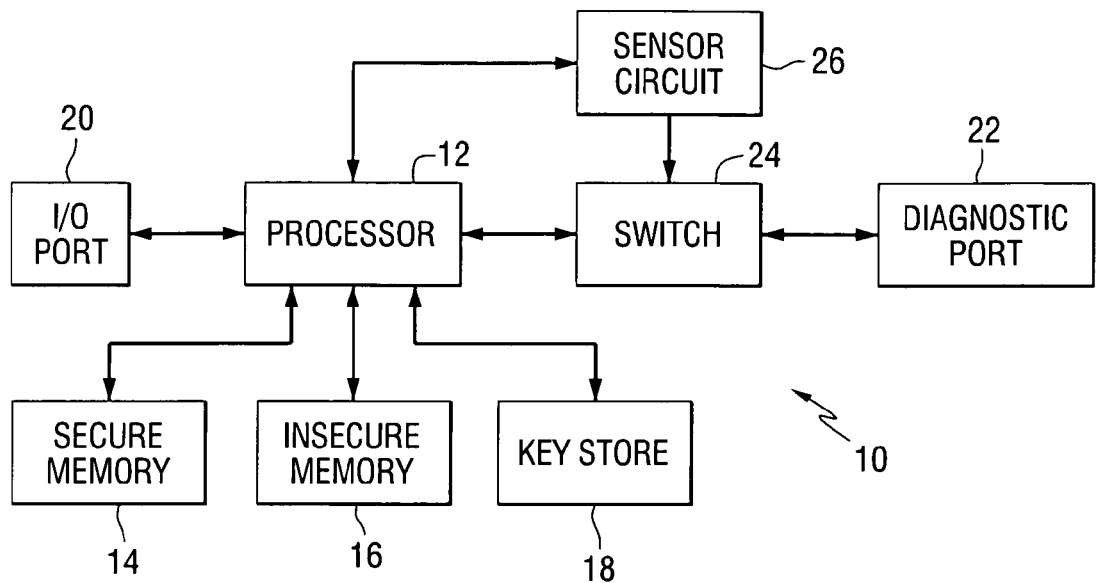
FIG. 1 is a block diagram of a microprocessor system that includes a diagnostic port in accordance with this invention.

Referring to the drawings, FIG. 1 is a block diagram of a microprocessor system 10 that includes a diagnostic port in accordance with this invention. The system includes a processor 12, a secure memory 14, an insecure memory 16, and a key store 18, which can be a non-volatile memory. The secure memory and key store are not accessible from outside of the system. At least one input/output (I/O) port 20 is provided so that the processor can operate in conjunction with external devices. A diagnostic port 22 is provided to connect diagnostic equipment to the system. A switching circuit 24 includes a switch that is used to connect or disconnect the diagnostic port and the processor. The switch can be mechanical, electronic, magnetic, capacitive, photosensitive, or any other type known. An optional sensor circuit 26 can be provided to control the operation of the switch. The switching circuit is also connected to the key store 18 and a master key store. The switching circuit can erase the secure memory 14 as described below.

The processor is connected to the secure memory, and optionally, to insecure memory. The processor communicates to the outside world via an I/O port. The diagnostic port is coupled to the processor through the switch. The diagnostic port can be used to request execution of processor commands, read and/or write to memory, set breakpoints, and trace information movement in the processor system.

The optional sensor circuit is a hardware device that can be implemented in various ways. It detects if a connector is attached to the diagnostic port, and activates the switch in the switching circuit, which will in turn activate the diagnostic port following the implementation of several security features described below. By using the sensor circuit, no extra action is needed to enable the diagnostic port. Only a suitable cable has to be attached.

A secret root key is stored in the master key store. The root key can optionally be used to encrypt (one or more) user key(s), that are stored only in encrypted form in the key store 18, which may be a nonvolatile memory of the system (such as a disc, Flash, ROM, etc.). The user keys, if there are any, or the root key is used to encrypt all the confidential information stored in the system. The secret root key is not accessible from outside the microprocessor system.

The system also includes firmware having an unchangeable, or persistent, part (ROM code) and a changeable downloadable part. The unchangeable part of the system firmware can be used to perform an integrity and authenticity check on the rest of the firmware (downloadable) and the nonvolatile storage device. The firmware code can be stored in a nonvolatile part of the insecure memory 16, or in a separate nonvolatile program storage, such as a disc, FLASH memory, EPROM memory, or similar device.

Figure 2:
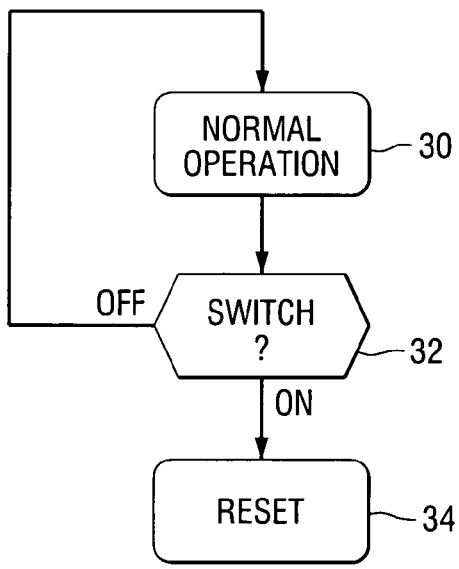
FIGS. 2 and 3 are flow diagrams that illustrate the operation of the invention.
Figure 3:
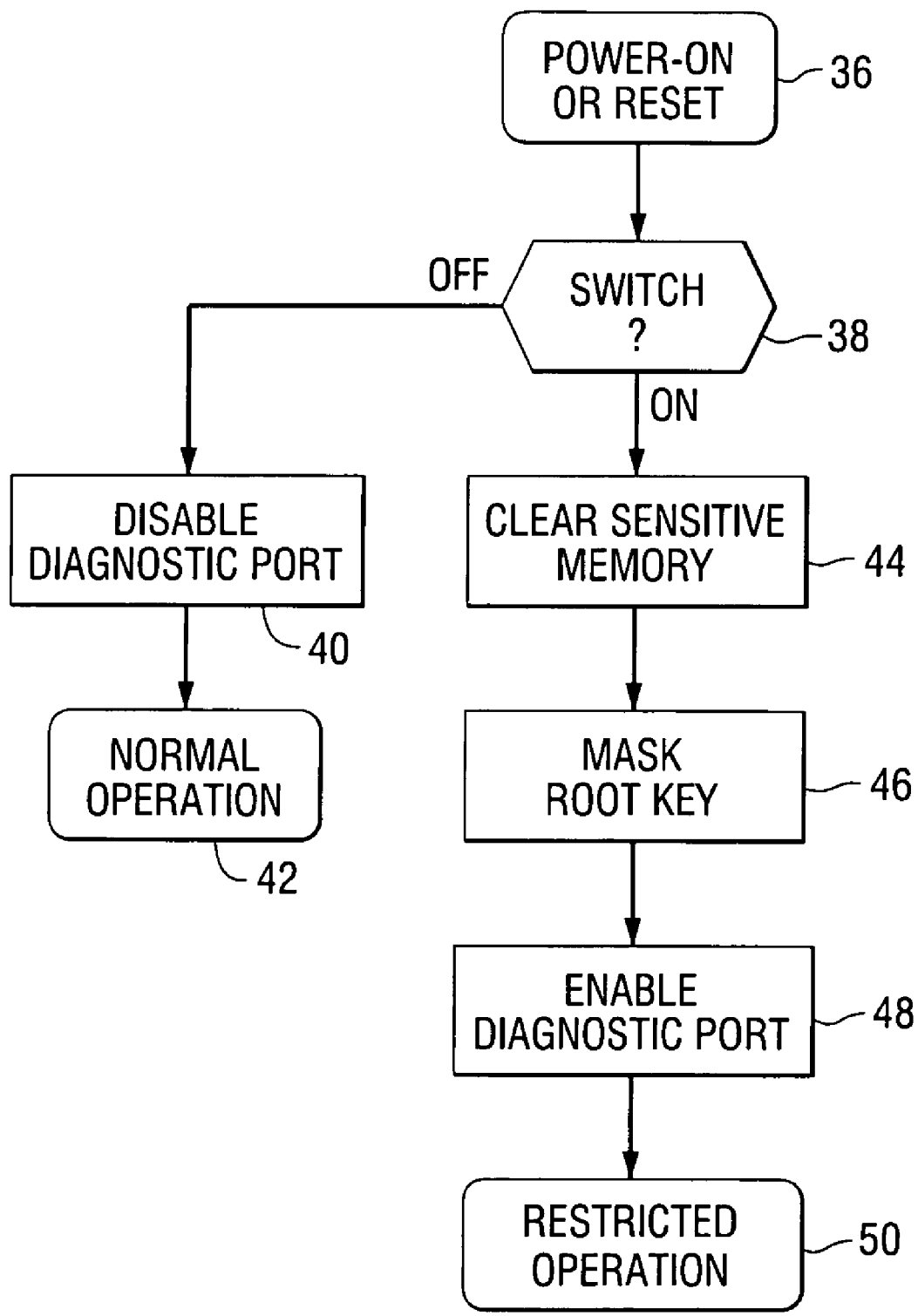

FIGS. 2 and 3 are flow diagrams that illustrate the operation of the invention. The functions described in the figures are performed in hardware, allowing the diagnosis (debugging) of the whole firmware code and the proper operation of the microprocessor. FIG. 2 illustrates the operation of the system when the switch is activated while the system is operating. During normal operation of the system (block 30), the status of the switch is checked (block 32). The activation of the switch can cause an immediate hardware action by starting an electronic circuit, which can be a part of the switching circuit 24, very much like an interrupt initiates actions in a microprocessor. Another alternative is that the hardware periodically checks the status of the switch and performs its actions accordingly. This check of the switch would be performed frequently enough, such that a human operator notices no disturbing delay (10 . . . 100 ms).

If the switch is off, normal operation continues. If the switch changes position from off to on, the system is reset (block 34). The reset occurs entirely under hardware control. The microprocessor can be reset by the switching circuit applying an appropriate voltage to the microprocessor reset pin. Other components of the system are similarly reset with appropriate reset signals, applied to their reset request lines, which are customarily provided in electronic circuits. The switching circuit would also mask the secret root key, which means that any access to the root key is temporarily diverted to access another, predetermined value. The root key itself is not changed. It only becomes hidden by being replaced during the time that diagnostic port is open.

When all of the reset operations and the key masking are complete, each electronic circuit can produce a logic "done" signal. The switching circuit would then perform AND operation of these "reset done" and "key masked" signals, and when the result is true, the switching circuit would close the switch to activate the diagnostic port (e.g. by operating a simple electronic switch to connect the diagnostic port pins to the internal diagnostic bus).

Alternatively, the system could be reset by another means, such as cutting the power, and the status of the switch would be ignored until the next boot-up, when the memory erase and the key masking occurs.

Resetting of the system can include the steps of erasing the contents of the memory, or prohibiting the changing of some nonvolatile memory in the system, etc. The diagnostic port remains disabled until the memory is cleared and the keys are masked. Thus the information contained in these components would not be accessible from outside of the system. Only volatile memory would be erased, with the same effects as a loss of power. Unfinished transactions have to be unrolled or finished when the system gets back to normal operation. The content of the erased volatile memory cannot be recovered, only recreated by the proper software under normal (non-diagnostic) operations.

FIG. 3 illustrates the operation of the system at start-up. When the system is started (block 36) the status of the switch is checked (block 38). If the switch is not activated, the diagnostic port is disabled (block 40) and normal operation of the system proceeds (block 42). In this condition, the status of the switch is repeatedly checked as shown in FIG. 2.

If the switch is activated at start-up, sensitive memory is cleared (block 44), the root key is masked or blocked (block 46), and the diagnostic port is enabled (block 48). After these steps, the system can be limited to some restricted operations and system access to the root key results in some predetermined value, such as all 0's (block 50). The root key and the masked root key are accessible by the microprocessor via an alternating switch (multiplexer) in the switching circuit (see FIG. 1.). When the root key is masked, a hardware signal selects another set of inputs of the multiplexer. These input lines can lead to internal read-only memory cells or direct (hard wired) connections to the ground (logic 0) or the supply voltage (logic 1).

The root key is needed to encrypt and decrypt confidential information in the system. Since the root key is blocked, no secrets can be decrypted. Even if a new, unauthorized firmware were to be downloaded, the next time the system boots up in a non-diagnostic mode, the unchangeable part of the system firmware (ROM code) can be used to detect the rogue firmware and halt operation of the system.

Further precautionary steps that may be taken prior to the reset actions described above include: erasing all sensitive memory (for example, temporary key registers, etc.), restricting erasure/reset to specified subsets of nonvolatile memory (where potentially large subsets contain "classified" information that is required to be made illegible but, for testing the software and the hardware memory, should remain accessible), and invoking an encryption mechanism to hide the current contents of volatile memory before clearing it.

Some form of tamper evidence can be provided, such as an extra physical detection mechanism (glue, paint, tape, plastic connector, oxidizer, snap), to indicate that the diagnostic port has been activated at least once. Further specific mechanisms used in conjunction with the sensor circuit to strengthen tamper-evidence may include employing a jumper connection which completes a circuit. The completion of the circuit prevents the diagnostic port from being activated. The jumper can act in conjunction with, or effectively be a part of, the switch. When the jumper is removed, the diagnostic port can be activated by way of the sensor circuit. The jumper can be sealed or physically connected in such a way that its removal is evident, i.e. replacing it undetectably is difficult. An advantage of this technique is the ability to decide, flexibly and simply, whether diagnosis will be enabled while simultaneously ensuring that any attempt at opening a diagnostic port will be detectable.

Using this invention, no secret information, such as user data, firmware code, or cryptographic keys, would be accessible via the diagnostic port. No damage would be done to the users' data (for example, no erasure of keys or other secrets). The switch can be a low cost and low complexity device, that provides reliable operation, so the loss of its diagnoseability can be accepted. Access to the diagnostic port can be easily verified. The microprocessor code can be diagnosed from the very first instruction, that is, the process of boot-up is included in the diagnoseable functions of the system. The boot-up process includes, as is usual in microprocessors, activating a circuit to clear the internal registers of the microprocessor and to set the instruction pointer of the microprocessor to a predetermined address in the read-only program memory, and providing an electronic signal causing the microprocessor start performing commands found in the program memory.

Port activation would not involve any firmware action (thereby enabling debugging of the firmware). Real code used in the field, not special versions, would be available for diagnosis. Hardware functions (including cryptographic functions) can be accessible, that is, the hardware in the diagnostic mode accepts the same requests as in normal mode and returns valid results. If the system includes (optional) restricted operations (like overwriting some nonvolatile memory areas), the restricted operations will not affect hardware accessibility. Non-security functions (such as code or hardware) would not be affected.

While the invention has been described in terms of several examples, it will be apparent to those skilled in the art that various changes can be made to the disclosed examples without departing from the invention as set forth in the following claims.

What is claimed is:

1. An electronic system comprising:
   a processor;
   a diagnostic port;
   a switching circuit, including a switch connected between the diagnostic port and the processor, for enabling and disabling the diagnostic port and for restricting access to contents of the electronic system prior to enabling the diagnostic port;
   a hardware sensor circuit for detecting if a connector is attached to the diagnostic port and for activating the switching circuit if the connector is detected; and
   a secret root key stored in a non-volatile memory for encrypting and decrypting data in the electronic system, wherein the switching circuit restricts access to contents of the electronic system by masking the secret root key such that attempted access to the secret root key results in a predetermined value, and wherein the switching circuit resets the system before the switch is closed.

2. The electronic system of claim 1, wherein the switching circuit further comprises:
   a multiplexer, wherein the switching circuit controls the operation of the multiplexer to alternatively enable or block the secret root key.

3. The electronic system of claim 1, wherein the switching circuit periodically checks the operational status of the switch.

4. The electronic system of claim 1, wherein resetting the system includes erasing memory.

5. The electronic system of claim 1, further comprising:
   a tamper indicating device for indicating that the diagnostic port has been used.

6. The electronic system of claim 1, wherein the switching circuit closes the switch after the system has been reset.

7. The electronic system of claim 1, further comprising:
   one or more user keys, generated by using the secret root key, for encrypting and decrypting data in the electronic system.

8. A method of operating an electronic system, the method comprising:
   providing a switching circuit, including a switch connected between a diagnostic port and a processor for enabling and disabling the diagnostic port;
   determining the operational status of the switch;
   using a hardware sensing circuit to detect if a connector is attached to the diagnostic port and to activate the switching circuit if the connector is detected; and
   using the switching circuit to restrict access to contents of the electronic system in response to the operational status of the switch prior to enabling the diagnostic port, wherein the switching circuit restricts access to contents of the electronic system by masking a secret root key such that attempted access to the secret root key results in a predetermined value, and wherein the switching circuit resets the system before the switch is closed.

9. The method of claim 8, wherein the switching circuit restricts access to contents of the electronic system by erasing memory.

10. The method of claim 8, wherein the switching circuit restricts access to contents of the electronic system by erasure or reset of a subset of memory.

11. The method of claim 8, wherein the switching circuit restricts access to contents of volatile memory of the electronic system by encrypting the volatile memory contents prior to erasing the volatile memory.

12. The method of claim 8, wherein the switching circuit periodically checks the operational status of the switch.

13. The method of claim 8, wherein resetting the system includes erasing memory.

* * * * *